(12) United States Patent
Eschenbrenner et al.

(10) Patent No.: US 8,205,291 B2
(45) Date of Patent: Jun. 26, 2012

(54) WIPER SYSTEM FOR FRONT WINDSCREENS OF MOTOR VEHICLES

(75) Inventors: Nicolas Eschenbrenner, Fontoy (FR); Francois Schabanel, Saint Maur des Fosses (FR)

(73) Assignee: Robert Bosch GmbH, Stuttgart (DE)

( * ) Notice: Subject to any disclaimer, the term of this patent is extended or adjusted under 35 U.S.C. 154(b) by 1092 days.

(21) Appl. No.: 12/089,733

(22) PCT Filed: Oct. 9, 2006

(86) PCT No.: PCT/EP2006/067203
§ 371 (c)(1),
(2), (4) Date: Apr. 10, 2008

(87) PCT Pub. No.: WO2007/051688
PCT Pub. Date: May 10, 2007

(65) Prior Publication Data
US 2008/0250595 A1    Oct. 16, 2008

(30) Foreign Application Priority Data
Oct. 31, 2005   (DE) .......................... 10 2005 052 036

(51) Int. Cl.
*B60S 1/06* (2006.01)
*B60S 1/24* (2006.01)
*B60S 1/34* (2006.01)

(52) U.S. Cl. .................. 15/250.21; 15/250.3; 15/250.31; 15/250.352

(58) Field of Classification Search ............... 15/250.21, 15/250.23, 250.351, 250.352, 250.34, 250.3, 15/250.31
See application file for complete search history.

(56) References Cited

U.S. PATENT DOCUMENTS

| | | | | |
|---|---|---|---|---|
| 3,292,200 A | * | 12/1966 | Scinta | 15/250.202 |
| 3,383,731 A | * | 5/1968 | Krohm | 15/250.352 |
| 3,656,208 A | * | 4/1972 | Kato et al. | 15/250.31 |
| 2003/0019092 A1 | | 1/2003 | Bente | |
| 2004/0093680 A1 | * | 5/2004 | Kagawa | 15/250.21 |
| 2005/0217056 A1 | | 10/2005 | Kagawa et al. | |

FOREIGN PATENT DOCUMENTS

| | | |
|---|---|---|
| DE | 630834 | 6/1936 |
| DE | 10241894 A1 | 3/2004 |
| JP | 2001219822 A | 9/2001 |
| JP | 2002225679 * | 8/2002 |
| JP | 2003276571 A | 10/2003 |

OTHER PUBLICATIONS

PCT/EP2006/067203 International Search Report.

* cited by examiner

*Primary Examiner* — Gary Graham
(74) *Attorney, Agent, or Firm* — Michael Best & Friedrich LLP

(57) ABSTRACT

The invention relates to a wiper system for the front windscreens of motor vehicles. Said system comprises at least one wiper blade, which can be guided over the front windscreen (4) on a pivotable wiper arm (11), at least one bearing part (1) that can be pivoted about an axis (5), at least one fixing part (10) that can be connected to the bearing part (1) in a non-torsional manner and at least one single-axis articulation that connects the wiper arm (11) to the fixing part (10). The position of the connection between the bearing part (1) and fixing part (10) lies in the vicinity of the axis (5) about which the bearing part (1) is pivoted.

14 Claims, 3 Drawing Sheets

WIPER SYSTEM FOR FRONT WINDSCREENS OF MOTOR VEHICLES

BACKGROUND OF THE INVENTION

The invention relates to a wiper system for front windshields of motor vehicles.

Wiper systems serve to maintain a free view in the event of a spontaneously occurring action upon vehicle windshields with sight-obstructing substances, in particular in the event of precipitation-induced sight obstructions due to adverse weather conditions.

Front windshields with enhanced functionality are increasingly found in modern motor vehicles. That is to say, in addition to ensuring that the driver has an unobstructed view, modern front windshields have to satisfy further functions relevant to safety, from mechanical occupant protection to static incorporation in strength calculations of bodywork and passenger compartment. This leads, firstly, to changes in the front windshield geometry and size and, secondly, to changes in the front windshield material in order to be able to satisfy the increased safety and strength requirements.

As a result of novel front windshield concepts, sometimes increased demands are made of wiper systems to be used. An enlarged field of view changes the viewing habits of the driver. Without any doubt, safety is served if said changed viewing habits are kept to even in adverse weather conditions, i.e. if the front windshield can be cleaned as completely as possible by the wiper system, that is to say, the wiper blades have to be guided under uniform contact pressure over the maximum possible surface regions.

A movement of the wiper blade is frequently realized by means of a pivotable arm which is connected via an articulation part to a fastening part which is pivoted about a fixed axis. The fastening part is driven via a wiper linkage which is generally installed such that it is concealed and, in conjunction with a wiper motor, transmits an alternating linear movement to a lever connected to the fastening part, or to a correspondingly designed bearing part. A pivotable fixing of the fastening part ensures an alternating pivoting movement of the fastening part, which movement is transmitted to the wiper arm. An elastic wiper blade is fitted at the end of the pivotable wiper arm. So that the wiper blade can follow the curved surface of the front windshield, the articulation part is usually designed in such a manner that the pivotable arm is connected to the fastening part in a manner such that it can be deflected perpendicular to the pivoting plane of the fastening part, and is prestressed in the direction of the front windshield by spring force, thus producing the required contact pressure at the wiper blade.

In order for the wiper blade to be able to traverse the maximum possible surface region of the front windshield, it is frequently endeavored to place the pivot axis as close as possible to or into the front windshield. This requirement sometimes also results from the installation spaces which are available in the vehicle body and make it appear expedient to place the wiper drive under the front windshield.

It is therefore known to guide a bearing shaft, which determines the pivot axis of the wiper system and to which a fastening part supporting the wiper arm is fitted, through an opening in the front windshield. However, this solution has the disadvantage that a piercing, which is required for this, of the front windshield is no longer permissible in many modern glass materials used for front windshields. Such a measure, which has an adverse effect on the surface stability and the fracturing behavior, is impermissible in particular in the case of frequently used laminated glass.

SUMMARY OF THE INVENTION

The object of the invention is to specify the possibility of enabling the maximum possible surface region of a front windshield to be traversed by a wiper system without requiring a bearing shaft to be passed through the front windshield.

The invention is based on a spatial separation of the pivot axis, about which a wiper arrangement is pivoted during the cleaning of the front windshield, from the bearing shaft which serves to hold a fastening part which supports the wiper arm with the wiper blade. The pivot axis is defined in a manner known per se by means of a positionally fixed shaft, a bearing bolt or the like. A pivotable bearing part is fitted onto said component which determines the pivot axis. According to the invention, said bearing part has a support structure which extends perpendicularly to the pivot axis and is designed for receiving a fastening means, for example a bearing shaft. Said fastening means serves to receive a fastening part which is connected to a wiper arm via an articulation part. If the arrangement of wiper arm, articulation part and fastening part is connected to the support structure of the bearing part in a manner secure against rotation by the fastening means, then the axis about which the bearing part is pivoted at the same time forms the axis about which the entire wiper arrangement is pivoted.

By means of the spatial separation, which is associated with such an arrangement, of the pivot axis, about which the wiper arrangement is pivoted, from the bearing shaft which serves to receive the fastening part, it is possible to shorten the positionally fixed shaft, which determines the position of the pivot axis, in such a manner that it can be arranged in the interior of a vehicle below the front windshield without touching the front windshield. It is therefore unnecessary to pass it through the front windshield. The extent of the support structure is selected such that the bearing shaft for receiving the fastening part is arranged below the border of the front windshield and a sufficient amount of space remains for pivoting the bearing part without it coming into contact with the front windshield.

Conventional front windshields are generally of relatively flat design with a small curvature and have small changes of curvature over the entire region to be traversed by the wiper blades. Wiper systems correspondingly designed for use on such windshields guide at least one wiper blade over the windshield, said wiper blade comprising an elastic holder which receives a strip-shaped rubber profile with a lip suitable for drawing over the windshield. The elastic properties of the wiper blade permit small differences between the curvature of the windshield and the curvature of the wiper blade in the relaxed state to be compensated for. In addition to an optimized selection of material and a lip shape matched to the wiper blade and in conjunction with an appropriate orientation of the placed-on lip of the wiper blade with respect to the normal of the windshield zone traversed, this ensures an effective and uniform keeping of the front windshield free from spray and rainwater. In particular, it is endeavored as a rule to arrange the wiper blade in such a manner that, during the drawing-over operation, compressions of the rubber lip are avoided. In the case of wiper systems operating bi-directionally, a corresponding folding over of the lip of the wiper blade generally takes place during the change in direction, which requires a largely perpendicular placing of the wiper blade on the windshield. All of these requirements can advantageously be met with the invention.

However, for use of the invention on wraparound windshields, it is possibly not sufficient to improve the surface performance by shifting the pivot axis under the windshield.

In contrast to conventional front windshields, wraparound windshields form a more sharply curved boundary surface of the passenger compartment. The passenger compartment is surrounded by the wraparound windshield over a greater spatial angle range than is the case in conventional front windshields with a small curvature. In contrast to conventional front windshields, wraparound windshields therefore have either a sharper curvature overall or surface regions with radii of curvature differing sharply from one another. The use of wraparound windshields is generally associated with a setback A pillar. For safety reasons, the lateral border regions of a wraparound windshield also have to be incorporated into the surface traversed by the wiper system. Even sharply curved lateral border regions of a wraparound windshield must not at any time obstruct the driver's view. These specifications are covered by authorization-relevant standards.

The sharper curvature or greatly differing curvature of a wraparound windshield in comparison to conventional front windshields cannot be compensated for in any case by the elastic properties of the wiper blade.

In addition, a wiper blade which is at a steep angle and is to traverse the border region of a wraparound windshield would be brought by the orientation of said border region, which is changed in comparison to conventional front windshields, into contact with the windshield at a very unfavorable angle of application. Said unfavorable angle of application would lead, firstly, to a reduced wiping capacity and to a possibly increased amount of wear of the wiper lip, and, secondly, would lead to very high frictional forces during the movement of the wiper blade, since, in the border region of the wraparound windshield, a considerable amount of the forces transmitted by the wiper linkage would act perpendicularly to the traversed surface and would therefore lead to additional pressure of the wiper blade against the wraparound windshield. Since the connection between the wiper linkage and the fastening part in any case constitutes the short lever of a system, the long lever of which is formed by the wiper arm and the wiper blade, extremely high forces would have to be applied by the wiper linkage in order to pivot the wiper blade back out of the border region of the wraparound windshield into the central region. With conventional dimensioning, there would also be, as a function of the sliding behavior of the wiper lip on the surface to be cleaned, the risk of the wiper blocking, which, in the case of a severely soiled front windshield, would lead to an acute risk to road users involved. The problem discussed is further intensified by wind loads which occur at high speeds.

In particular, the angle at which the lip of the wiper blade is brought into contact with the windshield therefore has to be adapted, as it traverses a wraparound windshield, to the particular surface region.

When a wiper system according to the invention is used on wraparound windshields, it is therefore advantageous, in addition to the bearing part according to the invention for connecting wiper arm and fastening part, to use an articulation part which corrects the wiper blade with respect to the normal as a function of the angle of lift.

For example, articulation parts are suitable for this, which are designed in such a manner that the axis of articulation projects significantly out of the plane perpendicular to the main axis of the wiper arm. It has been shown that, in this case, aerodynamic advantages can be combined with the advantage of a largely perpendicular placing on of the lip of the wiper blade during the entire wiping operation, even for wraparound windshields. An articulation part of this type forces a rotation of the wiper blade about the main axis of the wiper arm if the angle between the wiper arm and the fastening part changes. Said rotation of the wiper blade is used in order always to guide the lip of the wiper blade in an approximately perpendicular manner, but at least in a sufficiently steep manner, over the front windshield, even if the latter has a sharp curvature.

The use of a single-axis articulation part, the axis of articulation of which deviates from the perpendicular to the main axis of the wiper arm at least in the plane in which the fastening part is pivoted, is advantageous.

The deviation between the axis of articulation of the articulation part and the perpendicular to the main axis of the wiper arm in the plane in which the fastening part is pivoted advantageously lies within the range of between 5° and 45°. An angular range of between 5° and 30° has proven particularly successful.

An articulation part which is integrated in a wiper system according to the invention can be realized in various ways. It is important that it permits a pivoting about an axis of articulation and provides sufficient resistance to differently oriented torques acting on it. For example, the articulation part may comprise two eyes through which bearing bolts are guided. In order to realize the invention, it is insignificant whether the articulation part forms a separate component or is connected nonreleasably to the wiper arm and/or to the fastening part.

When a wiper system according to the invention is used on wraparound windshields with a gently curved central region and sharply curved border regions, it is particularly advantageous if the wiper blade can be moved between a steep end position in the sharply curved border region of the wraparound windshield and a flat end position in the central, more gently curved region of the wraparound windshield. In the case of systems of this type with external mounting, the pivot axis may be arranged in such a manner that a significant change in the angle between the wiper arm and the fastening part arises only when a wiper blade is at a relatively steep angle. As a result, the wiper blade traverses the relatively gently curved central region of the wraparound windshield with the wiper lip at a virtually constant approach angle. Only when the wiper blade is at a steeper angle does a significant turning-in according to the invention of the wiper blade take place, which permits adaptation of the movement to the more sharply curved border region of the wraparound windshield. As a result, sharp differences in curvature do not have to be compensated for by an elastic deformation of the wiper blade, and a uniform contact pressure over the entire length of the wiper blade can be realized independently of the curvature.

The orientation of the pivot axis about which the fastening part is pivoted and which is to be influenced in a simple manner by a bearing part according to the invention, and the angle by which the axis of articulation of the articulation part deviates from the orientation of the main axis of the wiper arm constitute parameters whose variation permits the wiper system according to the invention to be adapted to different geometrical boundary conditions of different wraparound windshields. The forces required for maintaining the pivoting movement can likewise be optimized by varying the above-mentioned parameters.

BRIEF DESCRIPTION OF THE DRAWINGS

The invention is explained in more detail using an exemplary embodiment. In the figures.

DETAILED DESCRIPTION

Figure 1:
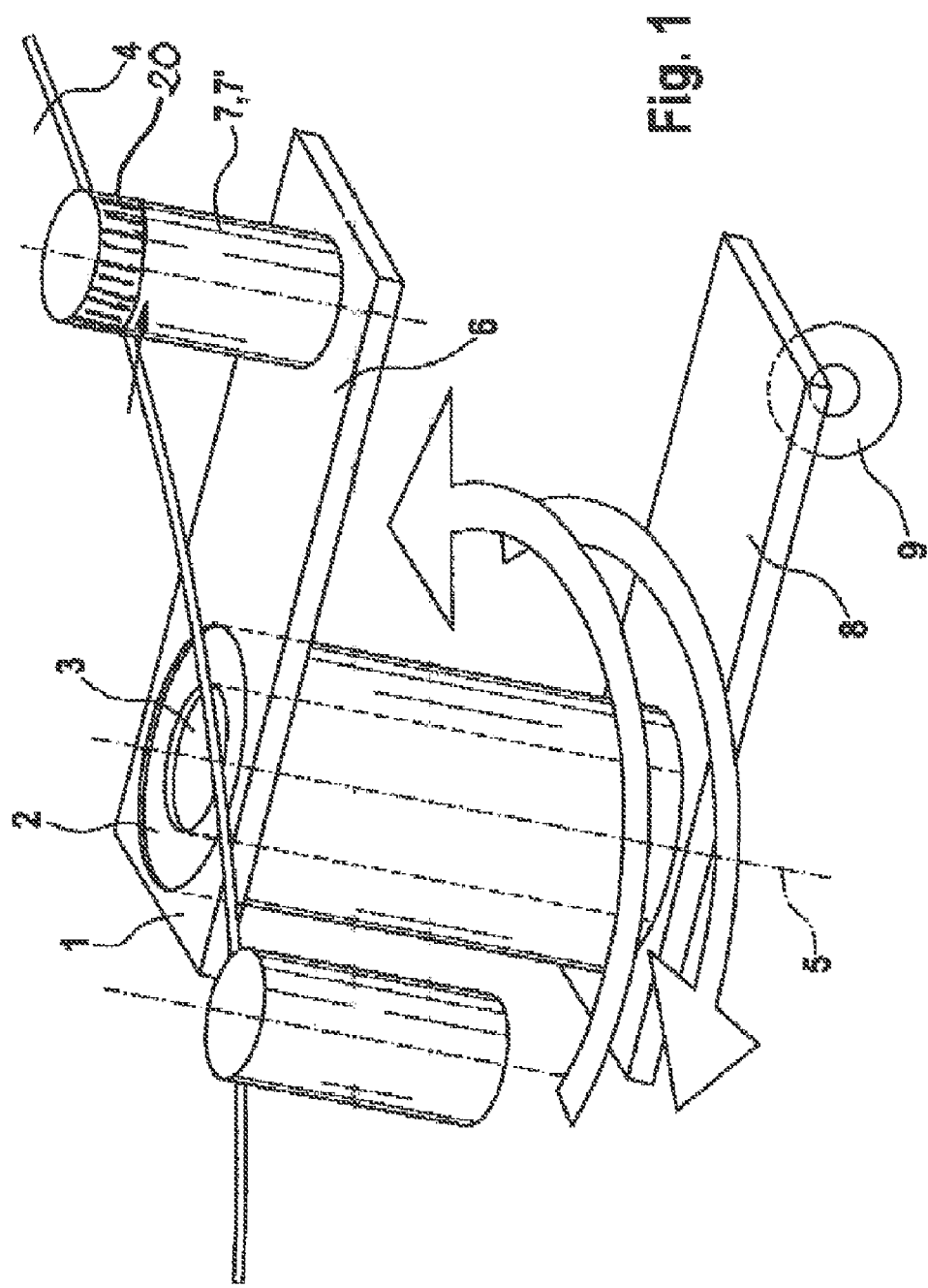
FIG. 1 shows a schematic illustration of a bearing part according to the invention.

FIG. 1 shows a schematic illustration of a bearing part 1 according to the invention. A bearing bushing 2 is pushed onto a bearing shaft 3 which is arranged in the vehicle interior in a positionally fixed manner below a front windshield 4 which is designed as a wraparound windshield. The bearing shaft 3 determines the position of the axis 5 about which the bearing part 1 can be pivoted. The bearing part 1 furthermore comprises a support 6 which is connected fixedly to the bearing bushing and on which a bolt-shaped bearing shaft 7 is fastened as the fastening means at a fixed distance from the bearing bushing 2. Said bearing shaft 7 serves to receive a fastening part which can be connected at this point to the bearing part 1 in a manner secure against rotation. The bearing bushing 2 ensures a pivotable arrangement of the bearing part 1 on the bearing shaft 3.

A spatial separation of the pivot axis 5, about which the bearing part and therefore the wiper arrangement is pivoted, from the bearing shaft which serves to receive the fastening part is thereby realized. Only by means of this separation is it possible to shorten the positionally fixed shaft 3, which determines the position of the pivot axis 5, in such a manner that it can be arranged in the interior of a vehicle below the front windshield 4 without touching the front windshield 4. It is therefore unnecessary to pass it through the front windshield. The extent of the support 6 is selected in such a manner that the bearing shaft 7 for receiving the fastening part is arranged below the border of the front windshield 4 and sufficient space remains for pivoting the bearing part 1 without it coming into contact with the front windshield 4. The arrows clarify the sequence of movement upon actuation of the wiper system. A lever 8 on which the wiper linkage acts, which is symbolized by a spherical bearing head 9, is fitted in the lower part of the bearing bushing 2.

Figure 2:
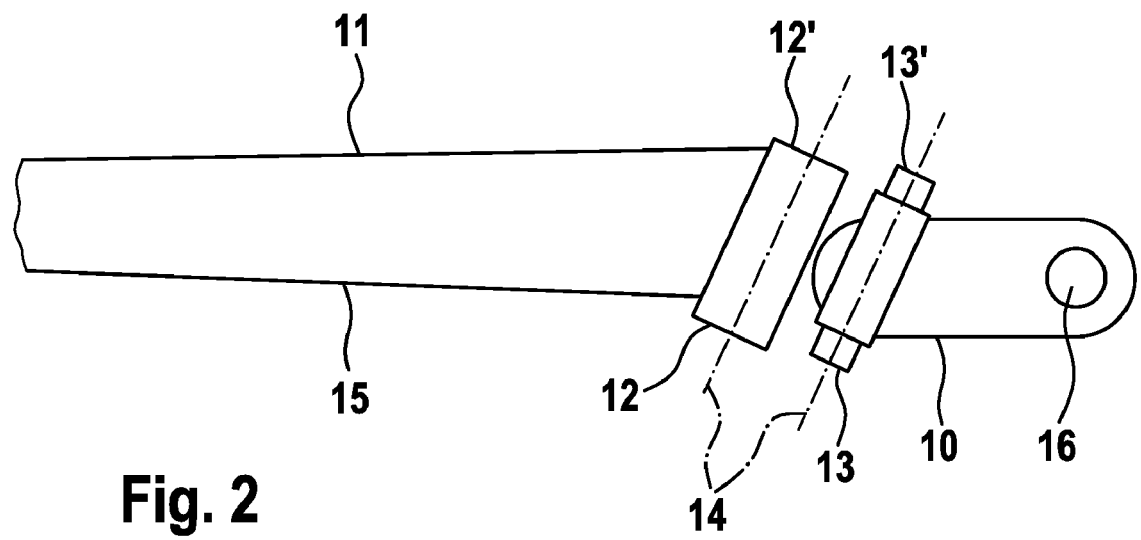
FIG. 2 shows an illustration of an advantageous articulation part.

FIG. 2 shows an illustration of an advantageous articulation part as can be used together with a bearing part according to the invention in wiper systems on wraparound windshields.

The articulation part connects a fastening part 10 to a wiper arm 11 of a wiper system. The articulation part is of hinge-shaped design. Two cheeks 12, 12' through which round openings lead are connected fixedly to the wiper arm 11. Bearing bolts 13, 13' which are guided through the openings in the cheeks 12, 12' are fitted to the fastening part 10. In this manner, and with an appropriately strong design, a stable articulated connection is realized between the wiper arm 11 and the fastening part 10, said articulated connection permitting pivoting about just one axis of articulation 14 and providing sufficient resistance to differently oriented torques acting on it. In the present exemplary embodiment, the articulation part does not constitute a separate component but rather is formed by an appropriate configuration of those ends of the wiper arm 11 and of the fastening part 10 which can be connected to one another.

The illustration shows the articulation part described in the separate state. The axis of articulation 14 is inclined with respect to the perpendicular to the main axis 15 of the wiper arm 11. As a result, an advantageous turning-in of the wiper blade during the correct pivoting movement of the fastening part 10 is forced if an additional pivoting of the wiper arm 11 about the axis of articulation 14 is connected to said pivoting movement. At one end, the fastening part 10 has a fastening opening 16 in which the fastening means 7 on the bearing part 1 engages in order to connect the fastening part 10 to the bearing part 1 in a manner secure against rotation.

Figure 3:
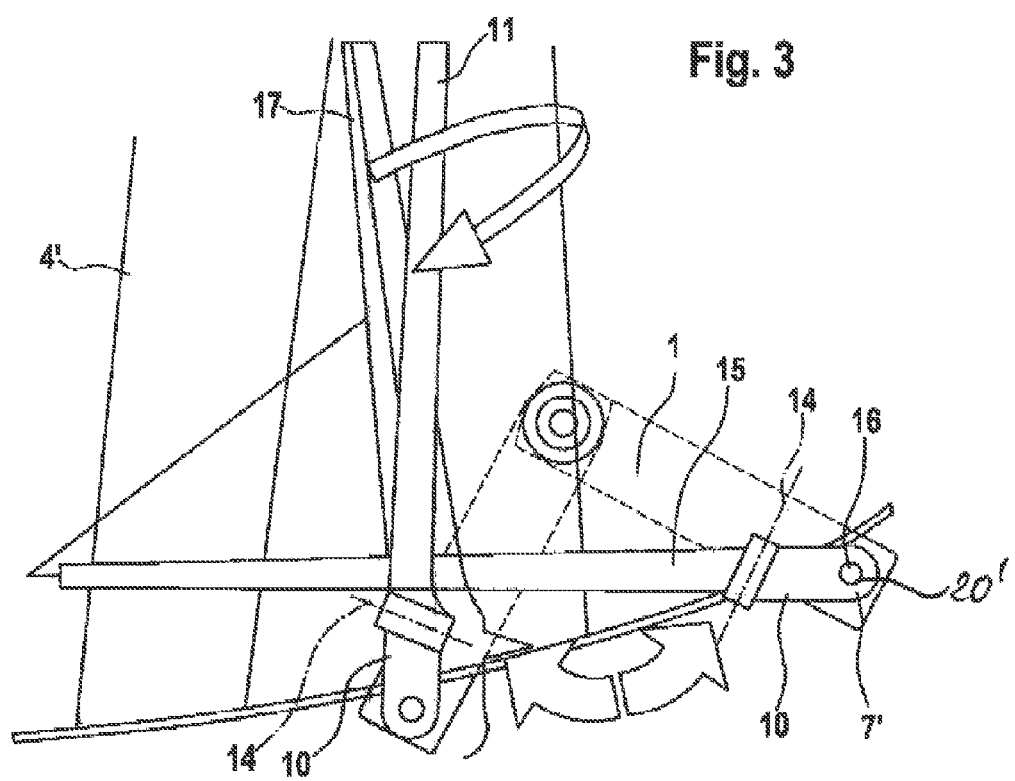
FIG. 3 shows a schematic overall illustration of a wiper system according to the invention in various pivoting states.

FIG. 3 shows a schematic overall illustration of a wiper system according to the invention in various pivoting states in front of a wraparound windshield 4'. If the arrangement comprising wiper arm 11 with wiper blade, articulation part and fastening part 10 is in an approximately horizontal position, in the present view the wiper arm 11 conceals the wiper blade which is arranged in such a manner that the lip 17 of the wiper blade sits approximately perpendicularly on the wraparound windshield 4'. The wiper arm 11 forms an extension of the fastening part 10 and is connected thereto by an asymmetrical articulation part with an oblique axis of articulation 14. The fastening part 10 can be pivoted about a fixed axis which is determined by a bearing shaft 3 which ends such that it is concealed below the wraparound windshield. A fastening means, which belongs to the bearing part 1 according to the invention and is in the form of a bolt-shaped bearing shaft 7', engages in the fastening opening 16 and permits a rotationally secure, but adjustable connection of the fastening part 10 to the bearing part 1.

If the wiper arrangement is pivoted into a steep position, the wiper arm 11 is set upright and at the same time is pivoted out of the direction of the extension of the fastening part 10. This pivoting takes place about the axis of articulation 14 which is inclined in relation to the main axis 15 of the wiper arm. The pivoting of the wiper arm 11 out of the direction of the extension of the fastening part 10 is therefore connected to a rotation of the wiper arm 11 about its main axis, which is clarified by the lip 17 of the wiper blade becoming visible. It can thereby be ensured that, even in the lateral border region of the wraparound windshield 4', which border region has a significantly changed orientation in relation to the central region, the lip 17 of the wiper blade is placed in a virtually perpendicular or at least sufficiently steep manner in order to obtain a careful and effective cleaning action.

The invention claimed is:

1. A wiper system for front windshields of motor vehicles, comprising at least one wiper blade which can be guided over the front windshield (4) on a pivotable wiper arm (11), at least one bearing part (1) which can be pivoted about an axis (5), at least one fastening part (10) which can be connected to said bearing part (1) in a manner secure against rotation, and at least one single-axis articulation part which connects the wiper arm (11) to the fastening part (10) for permitting articulation about an axis of articulation (14), wherein a position of the connection of bearing part (1) and fastening part (10) is located next to the axis (5) about which the bearing part (1) is pivoted, characterized in that the bearing part (1) comprises a bearing bushing (2) which is placed pivotably onto a positionally fixed bearing shaft (3), with a lever (8) and a support structure (6) extending perpendicularly to the pivot axis (5) with the support structure extension defining a main axis, said support structure being connected to the bearing bushing (2) and being connected outside the pivot axis (5) to a fastening means (7) to which the fastening part (10) of the wiper arrangement can be fastened, wherein said lever (8) on which a wiper linkage acts is connected to the bearing bushing (2), wherein the supporting structure (6) and the lever (8) are adjusted essentially into the same direction, wherein the axis of articulation (14) of the articulation part deviates from a perpendicular to a main axis (15) of the wiper arm (11) in a plane in which the fastening part (10) is pivoted, wherein the axis of articulation (14) of the articulation part is substantially perpendicular to the main axis of the support structure (6).

2. The wiper arrangement as claimed in claim 1, characterized in that the fastening means (7) comprises a bolt-shaped bearing shaft (7'), the fastening part (10) has a fastening opening (16) into which the bolt-shaped bearing shaft (7') can be introduced and means (20, 20') are included which permit a rotationally secure but adjustable fastening of the fastening part (10) to the bolt-shaped bearing shaft (7').

3. The wiper system as claimed in claim 2, characterized in that the axis (5) about which the bearing part (1) is pivoted runs through the front windshield (4), with the positionally fixed bearing shaft (3) being arranged in a vehicle interior without touching the front windshield (4), and the fastening means (7) to which the fastening part (10) of the wiper arrangement can be fastened being located next to the front windshield (4) in every pivoting position of the bearing part (1).

4. The wiper system as claimed in claim 3, characterized in that the deviation between the axis of articulation (14) of the articulation part and the perpendicular to the main axis (15) of the wiper arm (11) in the plane in which the fastening part (10) is pivoted lies within the range of between 5° and 45°.

5. The wiper system as claimed in claim 3, characterized in that the deviation between the axis of articulation (14) of the articulation part and the perpendicular to the main axis (15) of the wiper arm (11) in the plane in which the fastening part (10) is pivoted lies within the range of between 5° and 30°.

6. The wiper system as claimed in claim 5, characterized in that the articulation part comprises two eyes through which bearing bolts (13, 13') are guided.

7. The wiper system as claimed in claim 6, characterized in that the articulation part is connected nonreleasably to the wiper arm (11) and/or to the fastening part (10).

8. The wiper system as claimed in claim 7, characterized in that at least one wiper blade can be moved between a steep end position in a sharply curved border region of a wraparound windshield (4') and a flat end position in a central, more gently curved region of the wraparound windshield (4').

9. The wiper system as claimed in claim 1, characterized in that the axis (5) about which the bearing part (1) is pivoted runs through the front windshield (4), with the positionally fixed bearing shaft (3) being arranged in a vehicle interior without touching the front windshield (4), and the fastening means (7) to which the fastening part (10) of the wiper arrangement can be fastened being located next to the front windshield (4) in every pivoting position of the bearing part (1).

10. The wiper system as claimed in claim 9, characterized in that at least one wiper blade can be moved between a steep end position in a sharply curved border region of a wraparound windshield (4') and a flat end position in a central, more gently curved region of the wraparound windshield (4').

11. The wiper system as claimed in claim 1, characterized in that the deviation between the axis of articulation (14) of the articulation part and the perpendicular to the main axis (15) of the wiper arm (11) in the plane in which the fastening part (10) is pivoted lies within the range of between 5° and 45°.

12. The wiper system as claimed in claim 1, characterized in that the deviation between the axis of articulation (14) of the articulation part and the perpendicular to the main axis (15) of the wiper arm (11) in the plane in which the fastening part (10) is pivoted lies within the range of between 5° and 30°.

13. The wiper system as claimed in claim 1, characterized in that the articulation part comprises two eyes through which bearing bolts (13, 13') are guided.

14. The wiper system as claimed in claim 1, characterized in that the articulation part is connected nonreleasably to the wiper arm (11) and/or to the fastening part (10).

* * * * *